(12) United States Patent
Brigham et al.

(10) Patent No.: US 10,031,260 B2
(45) Date of Patent: Jul. 24, 2018

(54) OBJECT SENSOR

(71) Applicant: 3M INNOVATIVE PROPERTIES COMPANY, St. Paul, MN (US)

(72) Inventors: Scott E. Brigham, Maplewood, MN (US); Kenneth A. Epstein, St. Paul, MN (US); Kiran S Kanukurthy, Cottage Grove, MN (US); John C. Schultz, Afton, MN (US); Philip E Watson, Mountain View, CA (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 229 days.

(21) Appl. No.: 15/105,607

(22) PCT Filed: Dec. 8, 2014

(86) PCT No.: PCT/US2014/069020
§ 371 (c)(1),
(2) Date: Jun. 17, 2016

(87) PCT Pub. No.: WO2015/094737
PCT Pub. Date: Jun. 25, 2015

(65) Prior Publication Data
US 2016/0320525 A1    Nov. 3, 2016

Related U.S. Application Data

(60) Provisional application No. 61/918,352, filed on Dec. 19, 2013.

(51) Int. Cl.
*G06Q 30/02* (2012.01)
*G01V 8/20* (2006.01)
*G09F 27/00* (2006.01)

(52) U.S. Cl.
CPC ............... *G01V 8/20* (2013.01); *G06Q 30/02* (2013.01); *G09F 27/00* (2013.01); *G09F 2027/001* (2013.01); *Y04S 50/14* (2013.01)

(58) Field of Classification Search
CPC ..... G01V 8/20; G09F 27/00; G09F 2027/001; G06Q 30/02; Y04S 50/14
See application file for complete search history.

(56) References Cited

U.S. PATENT DOCUMENTS

| | | |
|---|---|---|
| 4,573,764 A | 3/1986 | Bradley |
| 5,128,783 A | 7/1992 | Abileah |

(Continued)

FOREIGN PATENT DOCUMENTS

| | | |
|---|---|---|
| SE | 456860 | 11/1988 |
| WO | WO 2001/026068 | 4/2001 |

(Continued)

OTHER PUBLICATIONS

"Optical Mouse", Wikipedia, [retrieved from internet on Jul. 31, 2016] URL <http://en.wikipedia.org/wiki/Optical_mouse>, pp. 6.

(Continued)

*Primary Examiner* — Tony Ko
(74) *Attorney, Agent, or Firm* — Emily V. Hargett

(57) ABSTRACT

A sensor comprising a thin film photovoltaic pixel is fitted with optics to provide a field-of-view for the sensing of persons, or other objects, entering or exiting said field-of-view. When a person enters the field-of-view, a processor may sense such entry, then provide signals to other electronic apparatus indicative of such an event.

24 Claims, 10 Drawing Sheets

(56) References Cited

U.S. PATENT DOCUMENTS

| | | |
|---|---|---|
| 5,973,732 A | 10/1999 | Guthrie |
| 6,476,376 B1 | 11/2002 | Biegelsen |
| 6,545,761 B1 | 4/2003 | Aziz |
| 6,570,492 B1 | 5/2003 | Peratoner |
| 6,958,862 B1 | 10/2005 | Joseph |
| 7,677,454 B2 | 3/2010 | Gelbman |
| 7,728,811 B2 | 6/2010 | Albert |
| 2003/0144034 A1 | 7/2003 | Hack |
| 2003/0210535 A1* | 11/2003 | Gaides ............... B60K 35/00 362/23.01 |
| 2003/0223057 A1 | 12/2003 | Ramsey |
| 2007/0094932 A1 | 5/2007 | Hoshide |
| 2008/0106628 A1 | 5/2008 | Cok |
| 2008/0109309 A1 | 5/2008 | Landau |
| 2008/0230497 A1 | 9/2008 | Strickland |
| 2009/0021612 A1 | 1/2009 | Hamilton, Jr. |
| 2010/0177749 A1 | 7/2010 | Essinger |
| 2011/0084717 A1 | 4/2011 | Fong |
| 2011/0109853 A1 | 5/2011 | Ge |
| 2011/0298481 A1 | 12/2011 | Mayer |
| 2012/0145880 A1 | 6/2012 | Wober |
| 2013/0153787 A1 | 6/2013 | Geaghan |
| 2016/0275568 A1* | 9/2016 | Zheng ............... G06Q 30/0275 |

FOREIGN PATENT DOCUMENTS

| | | |
|---|---|---|
| WO | WO 2009-075032 | 6/2009 |
| WO | WO 2015-048432 | 4/2015 |

OTHER PUBLICATIONS

"People Counter", Wikipedia, [retrieved from internet on Jul. 30, 2016] URL <http://en.wikipedia.org/wiki/People_counter>, pp. 5.
International Search Report for PCT International Application No. PCT/US2014/069020, dated Feb. 23, 2015, 3 pgs.
EP Search Report, EP 14871557.6, dated Jul. 12, 2017 (7 pages).

\* cited by examiner

US 10,031,260 B2

OBJECT SENSOR

CROSS REFERENCE TO RELATED APPLICATIONS

This application is a national stage filing under 35 U.S.C. 371 of PCT/US2014/069020, filed Dec. 8, 2014, which claims the benefit of U.S. Provisional Application No. 61/918,352, filed Dec. 19, 2013, the disclosure of which is incorporated by reference in its/their entirety herein.

BACKGROUND

Two common forms of signage in retail and public-space settings include digital displays on the one hand, and printed graphics on the other. Digital displays are commonly based on LCDs, projectors, or other electronically addressable display systems, and provide an image by electrically addressing the display system.

Although digital displays can provide changing images and video, the high initial cost layout for purchasing the equipment and the onerous operational support required to provide power, video signals, and frequently updated content to the display detracts from advantages associated with their technical capabilities. Printed graphics have multiple advantages as compared with digital displays: they are typically much lower cost than digital displays, they may be very flat and conformable to surfaces, and they require no external power supply. Disadvantages include the limitations of the use experience—it is typically a non-interactive experience that can be easily ignored.

SUMMARY

A photovoltaic sensor element with associated optics provides for sensing of objects within a field-of-view. In some embodiments, such a sensor element is low power, and may be suitable for extended battery operation. In some embodiments, such a sensor element is combined with graphic signage (e.g., printed advertisements, etc.) to sense the presence of objects walking in front of such advertisements. The sensor element is communicatively coupled to a processor, which may sense "events" associated with the field-of-view, e.g., the presence of a human-sized object, and upon detection of such events, initiate further indicia or activity, or provide signals indicative of such event to another processor.

In one embodiment, an electronic sensing card is described, comprising: a power source; a communications module; a processor;
  a first sensor component comprising first angle-selective optics disposed in front of a first thin-film photovoltaic pixel, such that the first angle-selective optics are associated with a first field-of-view; and wherein the power source, the wireless communications module, the processor, and the first sensor component are communicatively coupled with one another.

These and other embodiments are more fully described herein.

DETAILED DESCRIPTION

Figure 1:
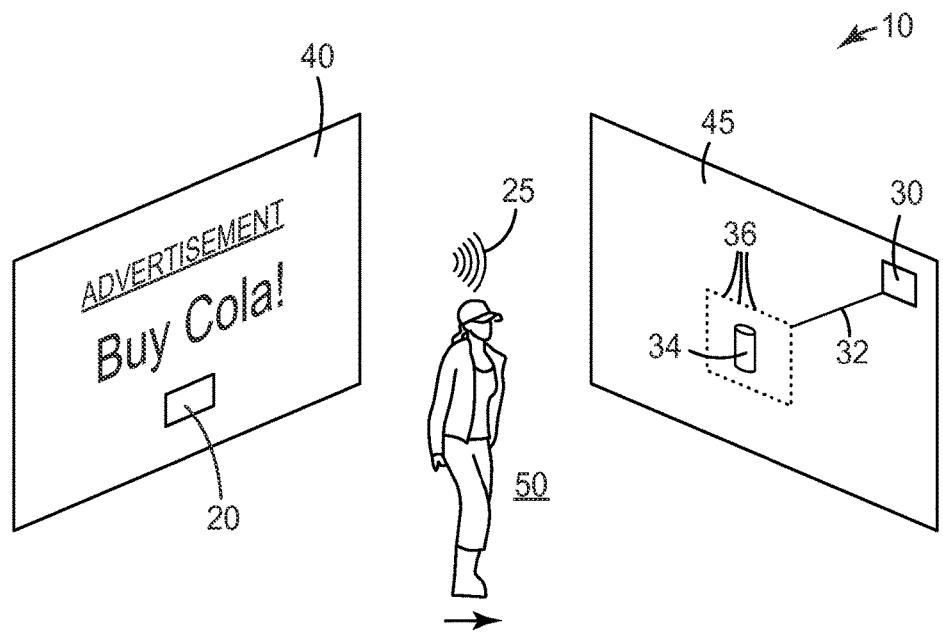
FIG. 1 is drawing showing one exemplary embodiment of interactivity cards in conjunction with printed advertisements.

FIG. 1 shows how interactivity cards may be used in conjunction with content, such as advertising content. Advertising scenario 10 has person 50 walking past two banner advertisements (40 and 45). The advertising content associated with the first banner advertisement 40 highlights a product for person 50. Sensor card 20 is embedded within banner advertisement 40, and is configured to sense the presence of person 50. Sensor 20 is wirelessly communicatively coupled to response card 30, which is associated with banner advertisement 45. Upon sensing the presence of person 50, radio signal 25 is generated from an on-board radio associated with sensor card 20. A corresponding radio associated with response card 30 receives radio signal 25 and initiates an activity associated with it. In the embodiment shown in FIG. 1, the activity involves energizing LED light array 36 electrically coupled to response card 30 via conductor 32. The lights surround product 34, in this case a can of cola. As person 50 walks between signs, the two signs working in concert may provide a stronger impression for the person than would signs that do not have any interactivity associated with them.

Banner content 40 and 45 may comprise traditional print-type advertising content. It could also comprise any other type of suitable content. For example, content 40 and 45 could relate to direction-type navigational content, or instructions, etc. Such content may be printed on a film of some kind, such as a PVC-based web, then hung either indoors or outdoors. In some embodiments, either the sensor card or the response card need not be expressly associated with some piece of content. For example, sensor card 20 could be located discreetly in proximity to banner advertisement 45, for example hung on a wall or a ceiling. In such a scenario, banner advertisement 40 need not even exist. Conversely, the response component need not be strictly associated with a banner advertisement, either. For example, the LED array 34 could be associated with a 3D model of a can of cola, and the can itself would be illuminated as the example response.

The interactivity cards themselves are thin cards having circuitry that is further described below. They are designed to be small and discreet, and easy to operate. In a preferred embodiment, they are actually incorporated onto or around the printed content itself. For example, in the case of the sensor card 20, this might mean adhering the sensor card to the back side of the banner advertisement 40, with a discreet hole cut into the substrate to accommodate the sensor of sensor card 40. Another embodiment, shown later with respect to FIG. 6, has the interactivity card placed on the face side of the banner content, but then obscured with a perforated film printed to match the content it covers. In such an embodiment, the interactivity card may be adhesive backed, and be adhered directly to the face of the banner content. The perforations allow the sensor to carry out its sensing operation in some embodiments.

The sensor card includes a sensor component designed to sense an environmental property of interest. Such a property may be the presence of an object (typically of size from about the size of a human child to that of a vehicle), the movement of an object (and direction), the movement of the sensor itself, or the contact made between the sensor and a conductive object, etc. Any suitable sensor may be employed in the sensor card. Example sensor technology includes photovoltaic sensors, motion sensors, capacitive sensors, touch sensors, acoustic sensors, or temperature sensors. Additionally, the sensor may be an NFC (Near-Field-Communications)-based sensor that identifies the presence of a compatible card, such as a properly enabled store loyalty card. The sensor may additionally be a sensor that identifies the presence of a WiFi, Bluetooth, or other RF signature (for example, from a person's cellular phone device) that indicates a person's presence proximate a device. The sensor may also be an "event" sensor that, for example detects when a folded corrugate sign is unfolded; this event may be detected, for example by having the unfolding action mechanically break a small wire or piece of conductive foil that connects an analog input to a grounded input of a control IC.

The response card includes an action element designed to engage upon a signal from the sensor card indicative of a sensed activity. The action element may be anything that may change state based on signals provided from a processor on the response card. For example, the action element may be an array of LED lights, or a motor that activates a mechanical process, or a speaker system that plays a sound. The action element may be included in the housing of the response card, or it may be off-card but communicatively coupled to the card via conductors (as shown in FIG. 1), or wirelessly. The action element may also be an input to a digital device such as a media player connected to an LCD or projector, where the signal from the response card initiates a change in content state of the media player. Additionally, the action element may be coupled to the lighting system of the environment, causing the state of ambient illumination to change (for example, flashing). The action element may also be a machine intended to change the ambience of the setting, such as a fog machine or a fountain that may be activated by the response card's output signal. In some cases, the response card may be programmed such that not every signal results in the same action; for example a random number generator on the response card's processor may be used in an algorithm that selects activating a lighting element, a sound element, both, or neither. Further, the response itself may vary based on signals received from the sensor card. For example, the signals from the sensor card may activate a different response during the day or during the night. In another embodiment, the response card is programmed to know the date or time of day, and may vary the response based on these parameters (for example, associating a first activity (e.g., motion) with daylight, and another, second activity (e.g., motion combined with artificial lighting), with nighttime).

The interactivity cards are communicatively coupled via a wireless link. This wireless link is provided by a wireless communications module included in both the sensor card and the response card. In a preferred embodiment, this link is a radio link that implements a wireless radio communications protocol, such as 802.11x or ANT or Bluetooth™. However, other wireless communications approaches are possible, for example infrared, audio, infrasonic, ultrasonic, cellular, and the like.

Figure 2:
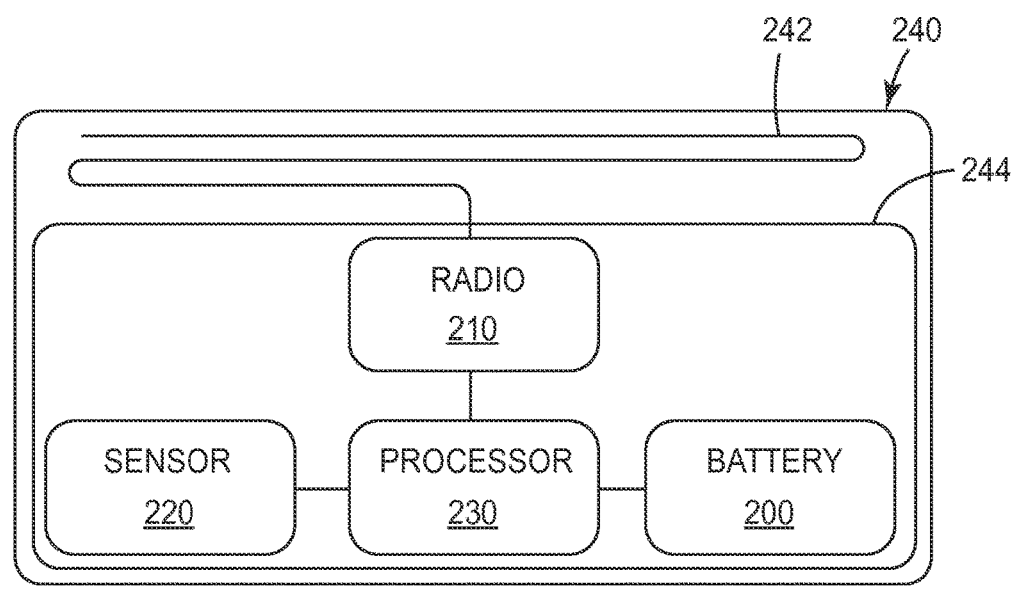
FIG. 2 is a simplified schematic of a sensor card.

FIG. 2 shows a schematic of sensor card 240. In one embodiment, sensor card 240 has electrical components mounted on a thin, flexible circuit board substrate 244. Materials suitable for circuit board substrate 244 include FR-4, polyimide, PET, PEN, PEI FEP and other thin, preferably flexible substrate materials. A wireless communications module, in this case radio 210, is communicatively coupled, via the circuit board substrate 244, to processor 230, which is in turn communicatively coupled to sensor 220 and electrically coupled to battery 200.

Radio 210 communicates with other interactivity cards, particularly paired response cards. Radio 210 implements a proprietary or known communications protocol, such as the Bluetooth™ LE protocol, ANT protocol, IEEE 802.15.4, or any other suitable low-power radio communication protocol. The communication may be at 900 MHz, 2.4 GHz, or another appropriate radio frequency. Example electronic communication chips are the Nordic Semiconductor nRF51422 ANT™ System on Chip, the Nordic Semiconductor nRF24AP2 Series, the Texas Instruments CC2570, the Nordic Semiconductor and the Nordic Semiconductor nRF51822 Bluetooth® low energy System on Chip.

Processor 240 can be one that is integrated on the same chip as the radio, such as the Nordic Semiconductor nRF51422 described above which includes the ANT™ radio and an ARM® Cortex™ M0 32-bit processor. It could also comprise a separate microcontroller such as a Microchip PIC or Texas Instruments MSP430 that interfaces to the radio chip through a standard interface such as SPI, IIC, or a UART.

Communicatively coupled to processor 240 is sensor 220. There may be more than one sensor coupled to processor 240, as part of sensor card 240, though only one is shown with respect to FIG. 2. Further, the sensor components may be physically included as part of sensor card 240, or they may be located off-card and tethered via conductors to processor 230.

Sensor 220 in one embodiment comprises a proximity sensor operating via optical sensing or capacitive sensing. For example, an optical proximity sensor may comprise a flat, flexible photovoltaic device with an optional optical management layer. Other possible low-power sensor types, such as photoconductive or photoresistive may be used. In all of these cases, polymeric forms of the sensor are preferred to maintain the flexible nature of the solution and potential compatibility with all-printed solutions. In preferred embodiments, sensor 220 is able to detect the presence and/or motion of human-sized (adult or child) objects or vehicles.

Sensor 220 may also be a passive sensor which is sensitive to touch, presence of a cellular device and the like. Sensor 220 may also be an active sensor with low powered emission of radio, acoustic or optical energy to enhance the detection of nearby objects or the detection of a change in nearby objects.

Figure 8A:
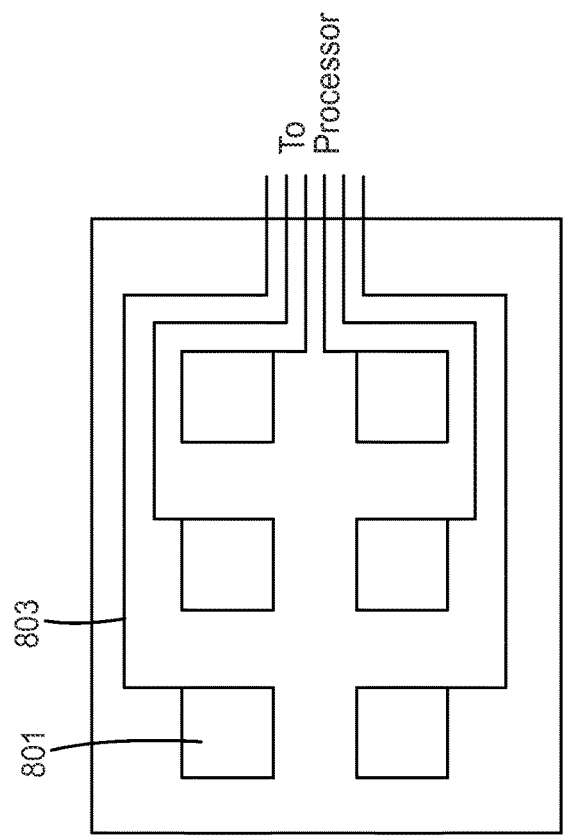
FIGS. 8a and 8b show drawings of sensor components comprising discreet sensing pixels.
Figure 8B:
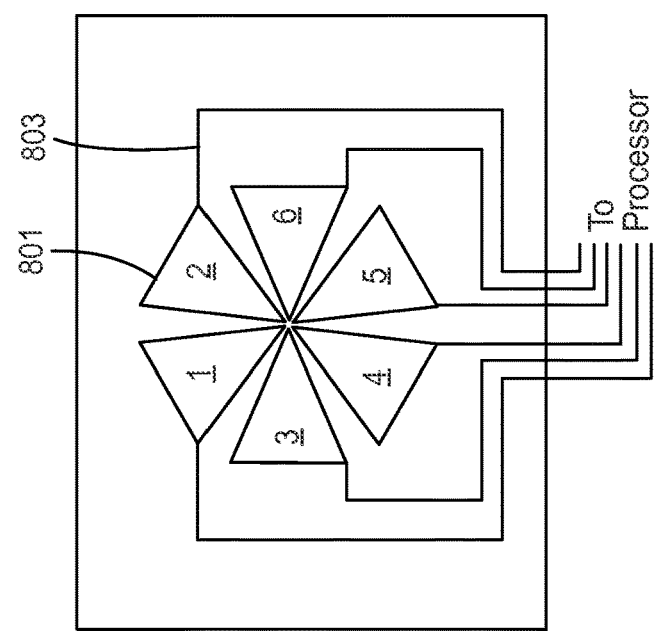

In one embodiment, sensor 220 comprises a photovoltaic sensor which includes at least two sensing areas, the at least two areas configured such that their outputs (e.g. voltages) may be independently measured. We shall call these independent sensing areas "sensing pixels." Such sensing pixels, in some embodiments, may provide a very low power sensing scheme, which may be suitable in some embodiments for a battery-based sensing deployment. In certain embodiments, additional optics are overlaid on top of the sensing pixels to provide the sensing pixel with a more defined field-of-view (FOV), which is further described below. Where such optics are included with the sensing pixel, we refer to such embodiments as "FOV sensing pixels." For example, FIGS. 8a and 8b, respectively, show two layouts in which the electrodes 803 from six independent sensing pixels 801 may be independently connected into analog inputs of an integrated circuit. Such a photovoltaic multiple-sensing-pixel sensor may have several advantages over conventional technology. First, the construction may be very thin and flexible. For example, the photovoltaic material may be made from small discrete elements of amorphous silicon, polysilicon, or organic photovoltaic material, which may be deposited on a very thin flexible substrate. Additionally for a FOV sensor, the optical elements that enable discretely measuring events occurring in separate fields of view may be extremely thin and flexible. A second potential advantage relates to the assembly's ability to be a net power generator. The sensing pixels have a primary function of providing information on the surrounding environment, but additionally may provide electrical power to charge the battery or activate an integrated circuit associated with the processor. A third potential advantage of enabling a film-like construction is in the efficiency of the associated manufacturing processes: creating multiple elements efficiently on a master-sheet or roll-good, then converting to units; printing; other roll-to-roll processes; and other film-compatible processes. An example of utilizing the advantages of film-compatible processing would be if elements of the system could be assembled efficiently via an automated or other repeated set of actions that selectively cuts, optionally rotates, spatially positions, and laminates one or more film elements to construct the sensor. These manufacturing advantages may enable larger-area and/or lower-cost sensors than are available through conventional technology.

The two or more sensing pixels may be formed through a variety of means. For example, the photovoltaic areas of the sensing pixels may be separate pieces of photovoltaic film that are laminated onto a common substrate. Alternately, the photovoltaic areas may be printed or coated, for example using photovoltaic ink materials such as Plexcore PV inks sold by Sigma Aldrich Corporation. Another option may include incorporating thin polycrystalline silicon or crystalline silicon photovoltaic elements into the sensor construction.

Figure 9:
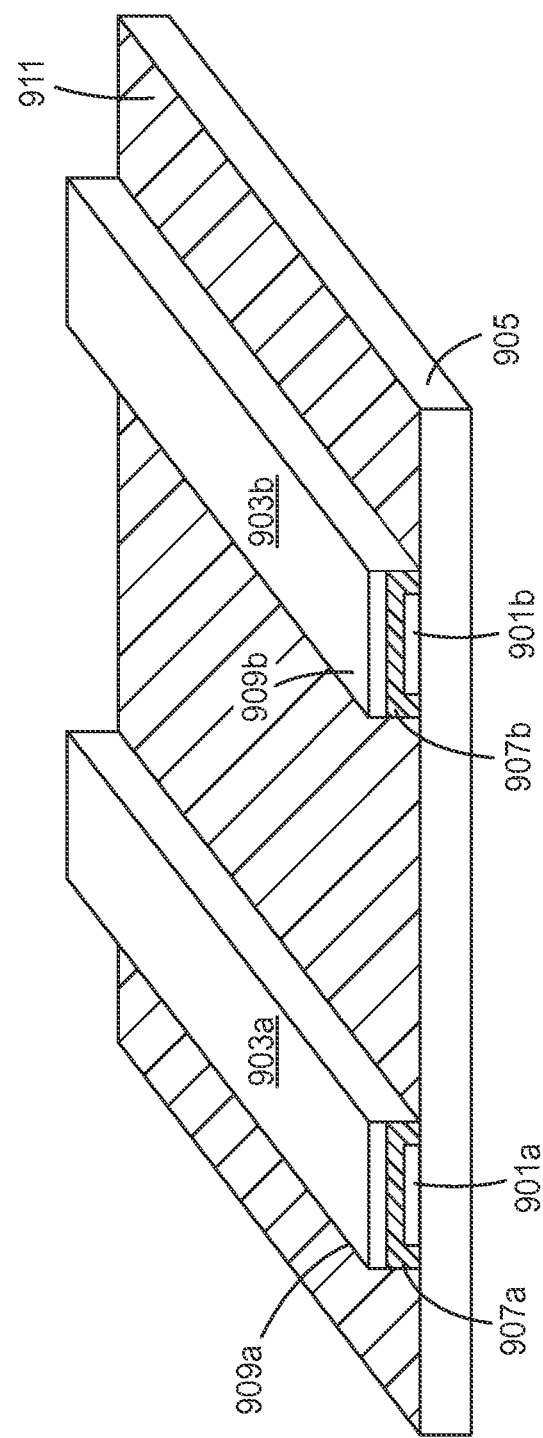
FIG. 9 shows an example material stack supporting sensing pixels.

FIG. 9 shows one example material stack that may be suitable for supporting sensing pixels. Copper or gold electrical cathode contacts 901a and 901b for two FOV sensing pixels 903a and 903b are configured on polyimide flex circuit 905. On top of these electrical contacts, photoactive ink layer 907a and 907b is disposed, by, for example, printing (e.g., in one embodiment using a screen printing process). Above that, hole transport ink layer 909a and 909b is deposited. An insulating dielectric material may optionally be deposited in the areas between the FOV sensing pixels 903a and 903b in order to planarize the structure. Finally, transparent anode 911, which may comprise indium tin oxide (ITO) deposited on polyethylene terephthalate (PET), silver nanowires coated on a flexible plastic substrate, or any other transparent conductive layer, is assembled as a common anode.

Figure 10:
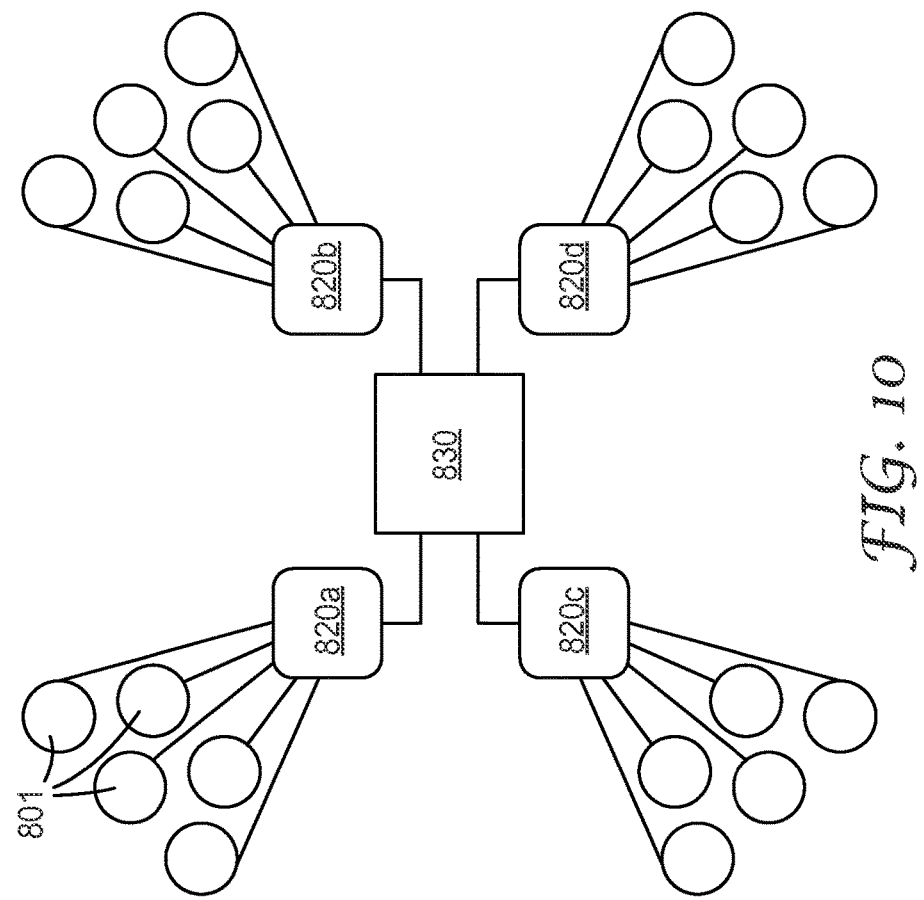
FIG. 10 shows a plan view layout of sensing pixels with four multiplexers coupling the sensing pixels to a processor.

FIG. 10 shows an example embodiment of a layout of sensing pixels that may be constructed based upon the approach described above. In this case, twenty independent sensing pixels 801 are created, for example on a polyimide flex or FR4 substrate. Four multiplexing elements 810a-d are connected to analog inputs of the integrated circuit, or processor, 830 (which may be a system on chip including a radio), enabling four analog inputs on processor 830 to detect information from 20 sensing pixels.

Figure 11:
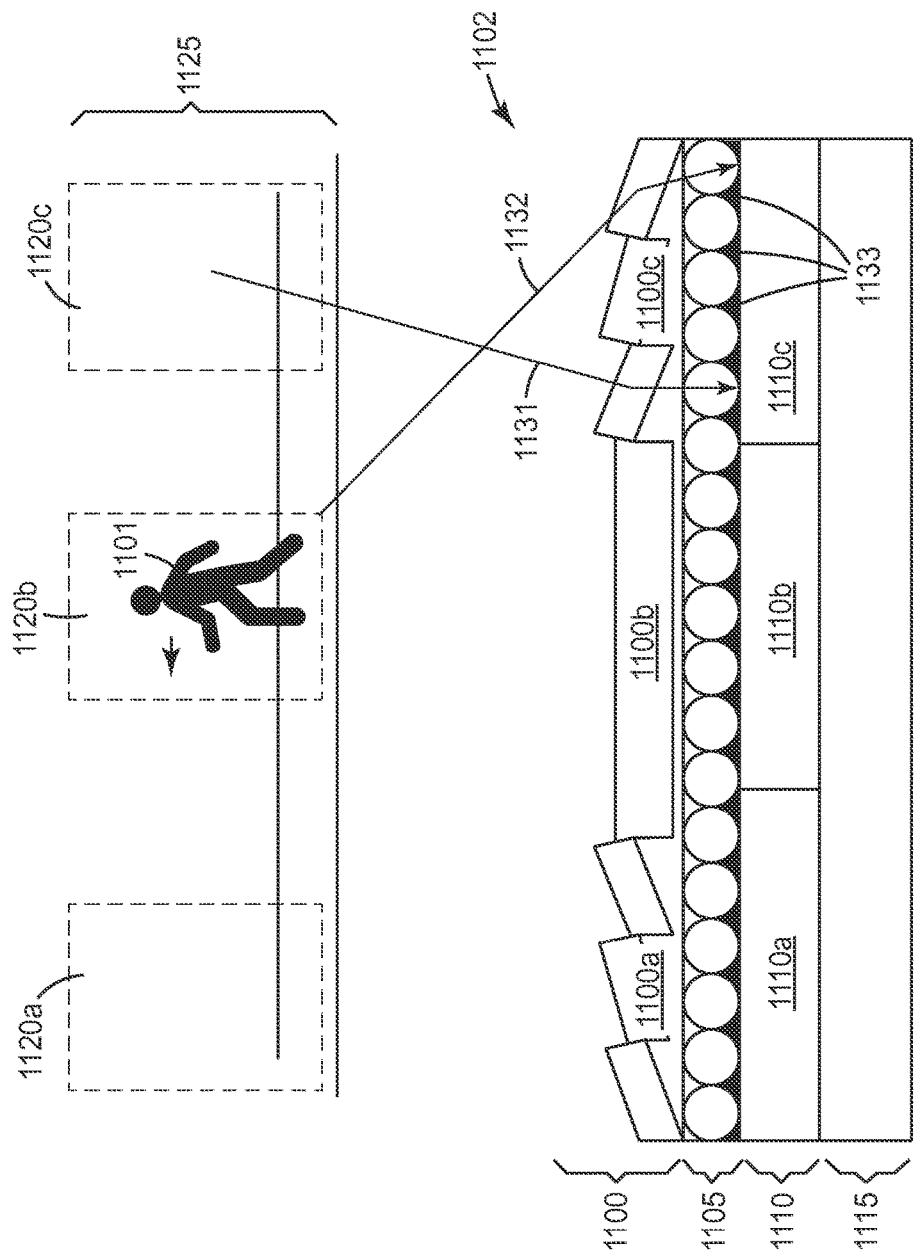
FIG. 11 is a drawing of a FOV sensor pixel with three FOVs, illustrating how a person might move through adjacent FOVs and be sensed.

Optionally, in some embodiments a lens or other angle differentiating optic structure may be disposed in front of the sensor component, to partition the sensor's field-of-view into discrete areas which are in turn associated with discrete sensing pixels that comprise the sensor component in some embodiments. This enables the sensor to behave as a primitive compound eye, with sensing pixels detecting light from different incident directions. FIG. 11 shows a sensor construction 1102 that may enable this optical differentiation. The top layer, facing a scene 1125 (a person walking from right to left on a sidewalk), is incident angle differentiation layer 1100. In this layer, optical structures re-direct incident light, such that light coming from a particular targeted set of incident directions will be directed in an approximately normal direction. The optical structures that physically overlay a given sensor pixel define the "field-of-view" (FOV) for that particular sensor pixel. In other words, the optical structures, in conjunction with collimating layer 1105 described below, map specific sensor pixels to corresponding solid-angle regions of the environment. In FIG. 11, incident angle differentiation layer 1100 includes three FOVs, FOV 1120a-c. The FOVs are ideally distinct from one another, though in practice they may overlap somewhat. Individual 1101, walking from right to left, will enter then exit FOV 1120c, then 1120b, then 1120a. Each of these FOVs is associated, respectively, with a special region on incident angle differentiation layer 1100. FOV 1120c, for example, corresponds to sensor pixel 1110c. Light element 1131 travelling from FOV 1120c, when it contacts angle differentiation layer region 1100c, will be reoriented so that it is largely normal to collimating layer 1105. Light element 1132 which does not originate from FOV 1120c, will be reoriented in such a way that it is not largely normal to collimating layer 1105. Incident angle differentiation layer 1100 is in one embodiment a film. Incident angle differentiation layer 1100 tends to redirect incident light coming from areas not associated with an associated FOV into non-normal directions. Incident angle differentiation layer 1100 is in one embodiment a film. Incident angle differentiation layer 1100 may comprise optical microstructures, such as a varying sawtooth pattern as shown in FIG. 11. Layer 1100 typically is formed from a UV-cured polymer resin, but may be formed from any material that enables formation of optical structures that redirect light in a directionally dependent manner. For example, layer 1100 may be formed from a silicone material, a molded plastic, or from thin glass. The shape of the optical structures on layer 1100 may be a sawtooth pattern, such as in 3M Image Directing Film—2 (IDF 2), available from 3M Company in St. Paul, Minn., and may be a right angle prism with one face of each facet blocked from transmission, such as through selectively depositing a reflecting material on the surface via vacuum evaporation or sputtering. Incident angle differentiation layer 1100 may comprise any other optical film that preferentially redirects light of a given set of directions into an approximately normal direction, while not redirecting light from other directions toward the normal direction.

Collimating layer 1105 only allows light of an approximately normal direction to pass. In some embodiment, collimating layer 1105 is optional. Collimating layer 1105 may provide one-dimensional or two-dimensional collimation. One-dimensional collimation may be achieved, for example with a microlouvered privacy film such as those sold by 3M Company of St. Paul, Minn. Two dimensional collimation may be achieved by use of a beaded material embedded in an absorbing matrix, as in 3M Company's Vikuiti RPF rear projection screen material. For example, light 1131 that is associated with FOV 1120a proceeds through incident angle differentiation layer facet 1100c, which redirects the light downward into a glass a glass bead associated with collimating layer 1105, which allows light 1131 to pass through to sensor layer 1110 because the light entering the glass bead was approximately normal. In contrast, light 1132, which is not associated with a FOV, may enter facet then be redirected downward into a glass bead. Since light 1132 did not enter the bead in an approximately normal vector, it is redirected to a light absorbing material 1133, and does not pass through to sensor layer 1110. Two dimensional collimation may also be provided by a pair of microlouvered privacy film layers that are oriented orthogonal to one another. Providing a narrower collimation angle can allow for greater optical fidelity for measuring objects at a distance, although total light throughput and therefore electrical signal strength may be compromised.

Sensor layer 1110 contains, in the embodiment shown in FIG. 11, three discrete sensing pixels, as described above. These sensing pixels would be in electrical communication with a microprocessor, or other device, which detects changes in voltage, the result of a change in the amount of light associated with a given FOV. For example, as individual 1101 walks into FOV 1120b, the amount of light associated with sensing pixel 1110b is reduced; conversely, when individual 1101 has left the area associated with FOV 1120b, the amount of light is increased. Of course, this assumes individual 1101 is blocking ambient light by walking through the respective FOVs—in other embodiments, as for example dark environments, a light could illuminate a person, car, etc. and the light associated with a given FOV would increase. Either way results in variability of light associated with a FOV, and such variability may be measured and associated with the presence (or lack thereof) of an object of interest. In the case where a photovoltaic cell is the sensing pixel, the open circuit voltage varies logarithmically with incident light. While these voltage variations are small at the light levels typically used for power generation from a photovoltaic cell (200 watts/$m^2$ and up), at the relatively low light levels associated with indoor lighting (typically 1-2 watts/$m^2$) the voltage variations are higher. By sensing changes in open circuit voltage with a differentiator circuit small incident light changes can be readily detected resulting in detection distances of 2.5 meters or more.

Substrate 1115 is the substrate onto which the other layers are mounted. In some embodiments substrate 1115 may be optional. Substrate 1115 could comprise PET, or FR4, for example.

Figure 13B:
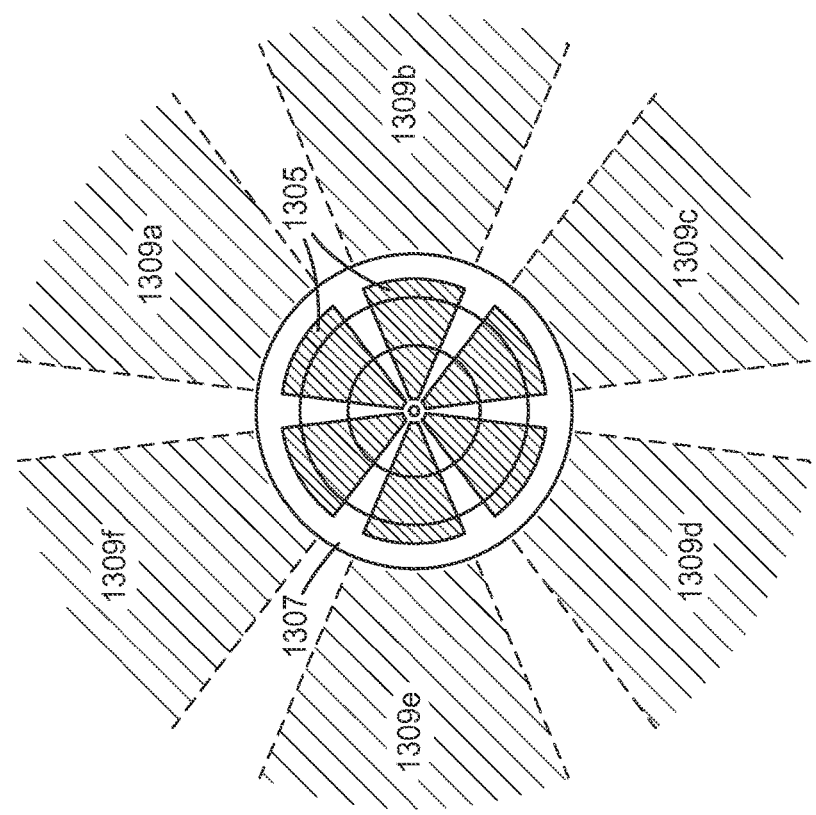
FIG. 13b is a plan view drawing of a sensor pixel with a radial Fresnel light steering optical element.
Figure 13A:
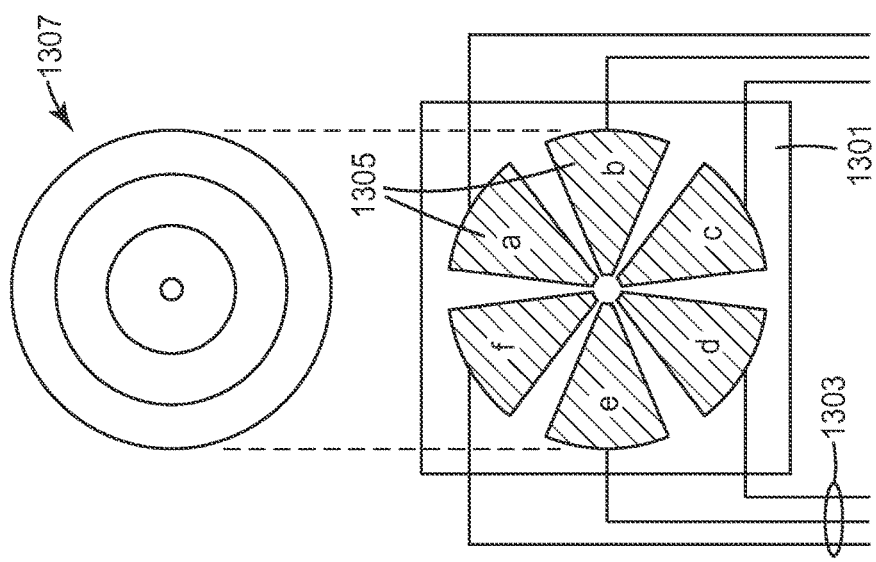
FIG. 13A is blow up drawing a sensor pixel with a radial microreplicated light steering optical element.
Figure 14:
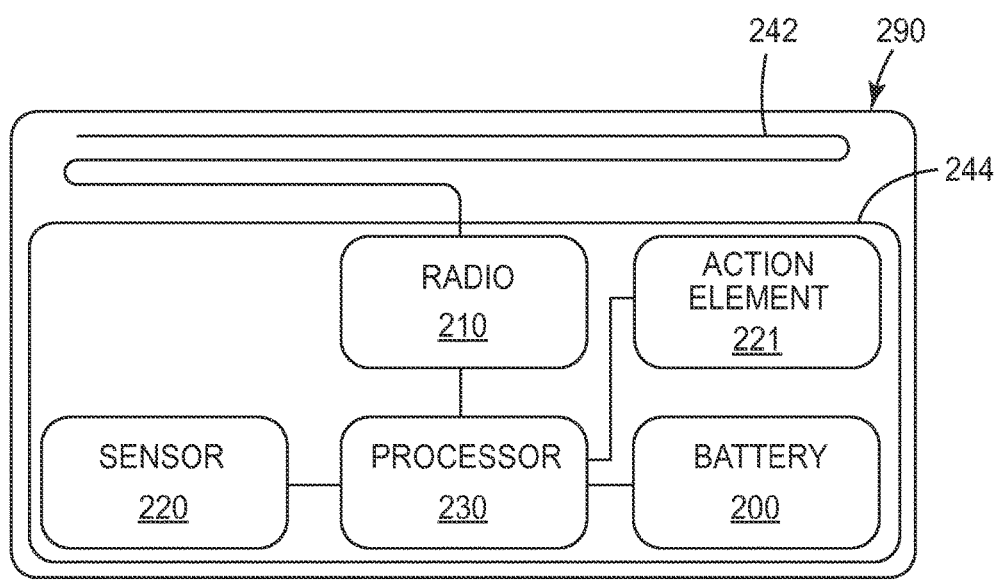
FIG. 14 is a diagram of an all-in-one embodiment of a sensor and activity card.

One design arrangement that uses a continuous optical microstructure overlaid upon the sensing pixels is shown in FIGS. 13a and *b*. FIG. 13a shows a blow-up view of such an embodiment, wherein the optics comprise a radial Fresnel optic 1307, which provides different acceptance angles for, in the embodiment shown, six sensor pixels 1305a-f (other numbers are possible). In this case, optic 1307 serves as an angle selection layer; however, in this case it is a continuous optical element rather than multiple distinct regions. As in the embodiment shown in FIG. 11, a collimating layer 1105 may be placed between optic 1307 and sensor pixels 1305 to improve measurement fidelity (not shown in FIG. 13a or *b*). The sensor pixels are mounted on substrate 1301, and electrodes 1303 communicatively couple individual sensor pixels with a measurement device, such as a processor (not shown). This configuration enables different FOVs associated with each sensor pixel, as may be seen in FIG. 13b, which is a plan view of the device shown in FIG. 13a. In this configuration, the FOVs surround the device, which may provide a great diversity of data to be collected by the device, thereby increasing detection accuracy and ability to differentiate types of events. For example, with a configuration as shown in FIG. 13, the effective FOVs associated with each FOV sensor pixel could sense external events such as persons walking by, with horizontal differentiation to detect position and speed, and vertical differentiation in order to differentiate children from adults. Of course, depending on the types of events intended to be detected by the FOV sensor pixels, the sensor pixels themselves could be tailored, in both size and position, relative to the lens to create different FOVs that serve the specific needs of the sensing objective. The optics may additionally include a light collimating layer. Other lens types are also possible, for example an axial rather than radial Fresnel lens might be advantageously used in some embodiments. The optical microstructures may be formed in a sawtooth pattern or in any other shape that may allow for angular differentiation of light.

Figure 12:
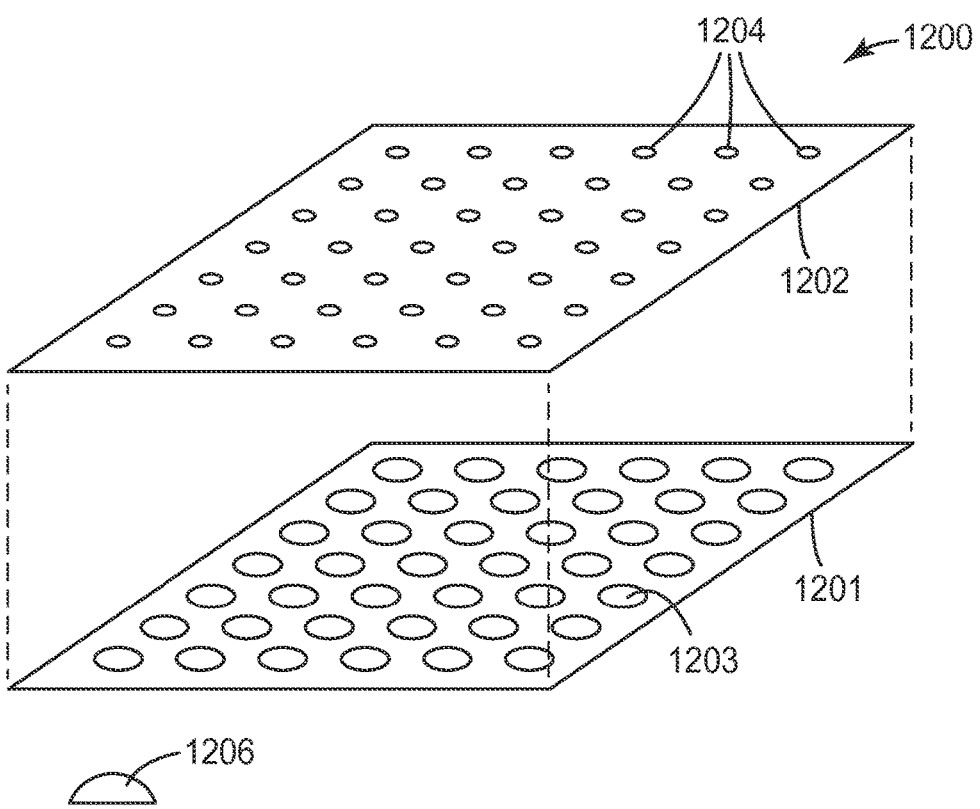
FIG. 12 is drawing of another embodiment of sensor pixel optics.

An alternate approach to providing angle selection and collimation (layers 1100 and 1105) is to provide a spatially-sensitive angularly selective layer, such as a lenslet array, positioned in registration with a spatial transmission mask. Such a construction 1200 is seen in FIG. 12. Spatially-sensitive angularly selective layer 1201 includes a number of lenslets 1203, the profile of one being shown as lens 1206. Microlens films are well known and available on the market. For example a microlens film on a plastic substrate as manufactured by SVG Optronics in Suzhou, China may be utilized in some embodiments. The microlenses in the film typically have a characteristic focal plane at which incident light from each lenslet will be confined to a small physical area. The microlenses may alternatively be formed through variations in refractive index within a film rather than through physical structures. Mask 1202 has a number of apertures 1204 in a light absorbing film. Each aperture 1204 in mask 1202 is associated with a microlens element such as 1203. The mask may be formed on a PET substrate, on the flat side of a microlens film, on another substrate, or may be self-supporting. The non-transmissive area of the mask may absorb, reflect, or scatter light, and may be printed or formed through a thermal transfer process or other method. The non transmissive elements of mask layer 1201 may include printed image or text elements, which for example may harmonize or blend with features in graphic 40. Layers 1201 and 1202 together act as an incident angle selection layer, and if apertures in mask 1202 are registered precisely centered with the lenslets in film 1201 and near the focal plane, they will allow primarily normally incident light to pass. If an aperture in the mask is off center relative to its associated lenslet, then it will allow light from a specific non-normal incident angle to pass through. By varying the mask layout so that apertures in different sensor pixel regions have different spatial displacements relative to their lenslet centers, it is possible to enable a spatially varying film that angularly selects incident light. Similarly, by varying the size of the apertures, the solid-angle area of the FOV may be adjusted to match design parameters for specific sensor pixels. The mask may be printed or deposited on a substrate that is laminated to one surface of the lenslet array film at approximately the focal plane, or may be printed or deposited directly on a flat surface of the lenslet array film, also approximately at the focal plane. The relative position of layers 1201 or 1202 may be reversed, such that lens film 1202 is facing toward the scene and the mask layer 1201 is adjacent to the sensor pixel, so long as the apertures are approximately located at the focal plane of the lenslet array.

The embodiments described with respect to FIGS. 11, 12, and 13 may be integrated into the embodiment described with respect to FIG. 9. In FIG. 9, two sensing pixels, 903a and 903b are shown. These sensing pixels correspond to sensing pixels 1110a-c in FIG. 11. Optical layers (1105 and 1100 in FIGS. 11; 1103 and 1202 in FIG. 12; conoscopic lens 1307 in FIG. 13a, optionally including a collimating layer (not shown)) would be disposed on top of such sensing pixels to make them FOV sensing pixels.

Sensors made according to the embodiments described above may in some embodiments reliably detect persons or things (of a certain size) entering or exiting a FOV. Additionally, it is possible to detect the speed of an object traversing the FOV. For example, an individual jogging past a detection device that ideally has two or three FOV sensor pixels may be distinguished from an individual casually strolling past. Additionally, two individuals may be distinguished from one, using certain assumptions regarding size. This data may be used to count the number of objects of a certain size passing by, or it may be used to trigger events associated with the activity cards. For example, if a person is jogging by one of the sensor cards having FOV sensor pixels aimed at them, a signal may be sent to an activity card associated with, e.g. an electronically addressable sign or other electronic apparatus (e.g., an LCD or plasma display, etc) further down the sidewalk that the person will soon encounter, and the electronically addressable sign may have indicia timed or content tailored to the jogger, as triggered from the activity card. In another embodiment, (the so-called all-in-one card), the sensor card itself triggers the activity, via the on-board processor, and no activity card is necessary. An all-in-one embodiment is shown in FIG. 11. All-in-one card 290 has components described above with respect to FIG. 4, but additionally includes action element 221, communicatively coupled to processor 230. As mentioned, in the all-in-one configuration, the sensor may be in one embodiment a photovoltaic sensor as described above. In such a configuration, the all-in-one card may be very power efficient, maintain a lower power sensing mode that uses reduced processor power until an event is sensed by sensor 220. In such an embodiment, the sensor card may be embedded within, behind, or proximate a sign, with electronic-based indicia on, within, or proximate the sign (such as LED lights, LCD screens, actuators that animate the sign, etc.). When the sensor card's FOV sensor pixels detect a signal associated with an individual moving in front of the sign, the indicia may be activated via a signal provided from the processor on the sensor card. The all-in-one activity card may drive and power an electronic apparatus (LEDs, electronic displays, mechanically operated widgets, relays, etc.) based on a detected event, or it may simply provide a signal indicative of an event to another electronic apparatus which then initiates an activity or series of activities based on receiving signals indicative of the event. The further electronic apparatus may have a processor of its own which processes information indicative of the signaled event, and then executes further instructions.

Other events of interest that may be detected by the embodiments described, in addition to person-sized objects moving through the FOVs, are dwell events, where a person-sized object has stopped in proximity to the sensor. This would cause a voltage drop (or rise depending on ambient lighting conditions) of a certain profile associated with one (or more) of the FOV sensor pixels. Ideally the processor implements an algorithm that monitors electronic signals associated with each FOV sensor pixel, and therefrom determines events that may be occurring within the particular FOVs. Each sensor pixel provides, in one embodiment, a readable voltage that illustrates changes in light relative to the background.

In addition to triggering events, in some embodiments the sensor pixels may detect traffic-related data that is sent, via wireless data communications, to a server that can analyze traffic patterns. The data sent may have already been algorithmically "interpreted" to convert it into events of interest, or the raw data may be sent and subsequently analyzed.

Some embodiments of the invention may also include a small low-cost camera, such as a CameraCube module from Omnivision, that may be mounted directly on the card and triggered to take data (a frame or series of frames) when the sensor pixels detect an event of significance. This image data may then be analyzed, stored, and/or communicated outward. This approach may enable an extremely low power normal operating mode, while allowing the possibility of greater, more valuable data in cases where it is desired.

Battery 200 comprises a thin, flexible battery. Battery 200 may be a non-rechargeable battery that has sufficient power for the lifetime of the interactivity card. In another embodiment, battery 200 is replaceable, preferably lasting one week or longer. Battery 200 may also be rechargeable. Battery 200 is preferably a thin cell that will allow for minimal distortion of a banner advertisement if positioned behind or in front of the banner. In one embodiment, a suitable battery includes the 3.7 volt, 3000 mAh JA-0545135P by Galvani, which is a credit card sized thin battery.

Antenna 242 may be disposed on or off of substrate 244. It is shown in FIG. 2 as extending off of substrate 244. If other types of communications modules are used instead of radio 210, the antenna may not be required. For example, in one embodiment instead the communications module comprises an infra-red communications module instead of a radio. In another embodiment, the communications module comprises drive circuitry to provide electrical communication with the one or more additional modules via an electrically conductive path, such as a wire, printed conductor or the like.

Figure 3:
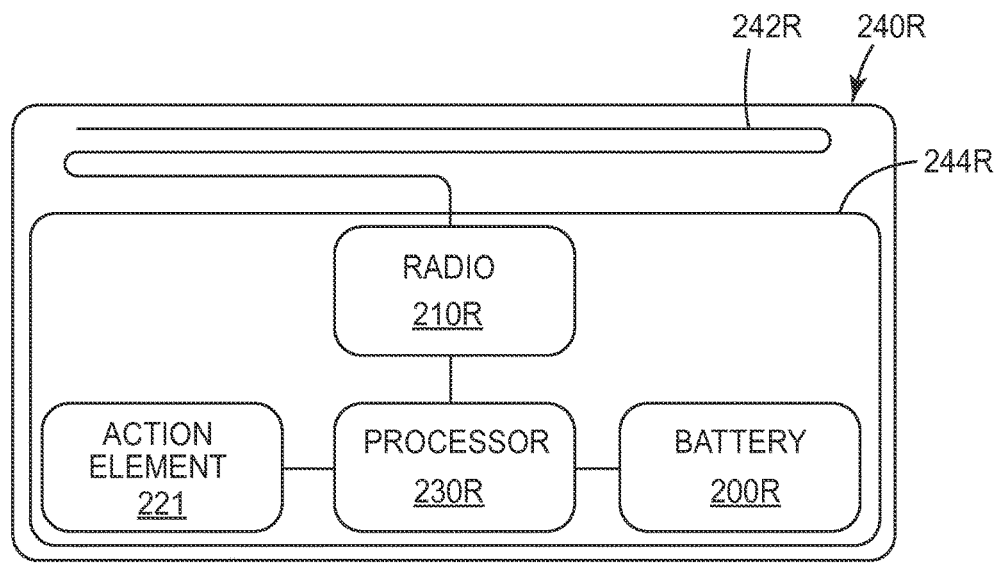
FIG. 3 is a simplified schematic of a response card.

FIG. 3 shows a schematic of response card 240R. Componentry included is similar to that which is shown with regard to sensor card 240 in FIG. 2, except that instead of a sensor the response card includes action element 221. Radio 210R receives communications from radio 210. Processor 230R analyzes the communications, and then may initiate activity associated with action element 221. For example, if action element 221 comprises an array of LED lights, as is shown in the example associated with FIG. 1, then processor may activate the LEDs, which may be traditional lights, or they may be used for other purposes (such as communications—ie, the LEDs could be IR, UV, optical pulsing, etc. to facilitate remote device communication).

Action element 221 is shown as physically part of response card 240R, but it may in other embodiments be located elsewhere but tethered to processor 230R via conductors, as is shown in the embodiment associated with FIG. 1.

Action element 221 may comprise LED lights, piezoelectric motors, speakers, electroactive polymers, chemical emissive devices (that is, odor emitters, phase change materials, or any device that may be activated via processor 220R.

Figure 4A:
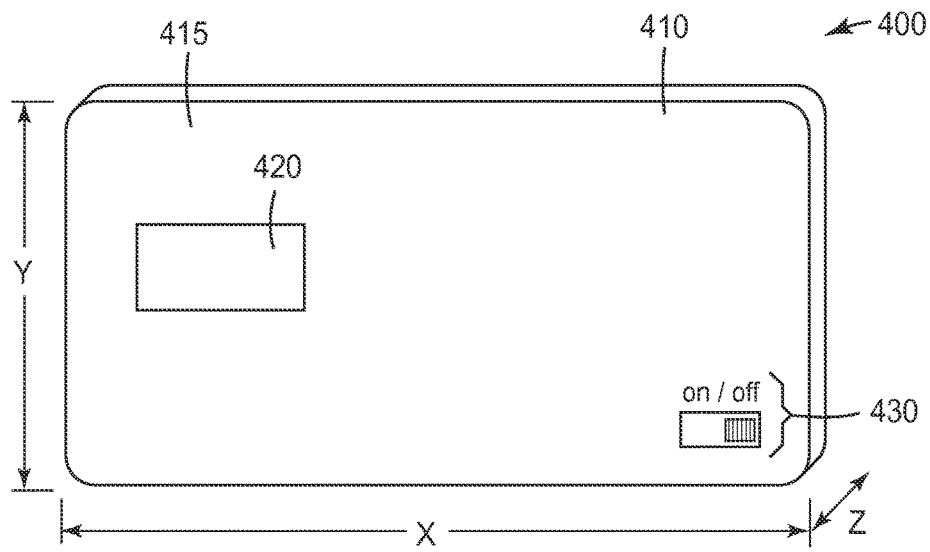
FIG. 4a is a plan-view drawing of the exterior of an interactivity card.

FIG. 4a shows a schematic of an example exterior housing of an interactivity card (either a sensor card or a receive card). The housing may be a thin, flexible plastic film. The thickness (Z axis) is in one embodiment less than 5 mm thick, and preferably less than 2 mm thick. It is flexible enough that it may be deformed to a radius of less than 152 mm, and preferably less than about 50 mm. The Y-dimension and X-dimension in one embodiment comprise 60×90 mm with a 50×50 mm battery on the board, or 30×67 mm with a 28×28 mm battery on the board. On/off switch 430 switches the interactivity card on or off. It may be a hard switch that actually breaks the power circuit included within the interactivity card, or it may be a soft switch that tells the interactivity card to go into a sleep mode. I/O area 420 accommodates either the sensor component (if a sensor card) or the activity component (if a response card). Of course, other embodiments are possible here, particularly if sensor or activity modules are tethered to the interactivity card. The shading 415 on interactivity card 400 signifies the presence of adhesive on the surface of the card. Using an adhesive is one possible way of mounting the interactivity card to a surface. Suitable adhesives include pressure sensitive adhesives such as 3M's VHB adhesives, hot-melt adhesives, and other commercially available adhesive systems. The use of removable and repositionable pressure-sensitive adhesives may allow simplicity of installation.

Figure 4B:
FIG. 4b is a profile-view drawing of the exterior of an interactivity card.

FIG. 4b shows one embodiment of the profile view of the interactivity card 400. The thickness of the card in this embodiment is shown tapering downward as a function of the distance to any edge. This tapering may, in some embodiments, assist in obscuring the presence of the card from a person's view when the card is positioned behind a printed graphic or other medium.

Figure 5:
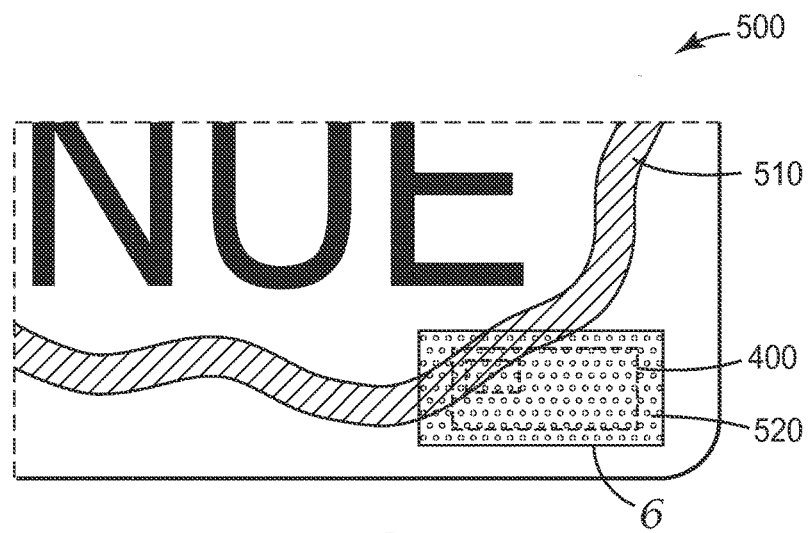
FIG. 5 is a drawing of a portion of a printed graphic with an interactivity card that is included on the face of the printed graphic obscured using perforated film.

FIG. 5 shows an exemplary embodiment of a portion of a printed graphic sign 500. Printed graphic sign 500 may be any type of printed graphic sign. Graphic element 510 is shown extending over an area of the printed graphic sign. Sensor card 400 has been adhered to the face of printed graphic sign 500. Perforated film piece 520 has been printed to match an underlying area of the printed graphic sign, and has then been adhered to a sub-area of the printed graphic sign where the graphic element matches. Perforated film piece 520 thus encapsulates sensor card 400, allowing it to sense environmental variables through the perforations, but being very discreet. By encapsulate, it is meant that the surface of sensor 400 is covered; it is not strictly necessary that the film piece 520 overlap sensor 520 in each dimension (though such overlap may be desirable and is within the scope of this disclosure).

One appropriate perforated film to use as perforated film piece 520 is available from 3M Company of St. Paul, Minn., under the trade name "Perforated Window Graphic Film." The perforated film piece in one embodiment isn't a separate piece—it is instead an area of the graphic sign which has been cut on demand for example with a Summa cutter, in which case the perforated film piece 520 would be an integral part of the printed graphic 500. Rather than a physically perforated film, a visually opaque but optically, acoustically, or thermally transparent film piece 520 or portion of the sign 500 could be used with a sensor 220 that was sensitive to IR, UV, etc. wavelengths, audio signal and/or the presence of thermal objects, for example, people.

Once constructed, the sensor card 520 may be adhered to the face of the graphic sign 500 using conventional pressure sensitive adhesive film and a laminating hand-roller application technique. The pressure-sensitive adhesive may be applied to the sensor card as part of the manufacturing process prior to installation on the graphic. The adhesive may be a permanent adhesive or facilitate removability. The graphic element 520 is placed on top of the graphic sign 500 so as to closely match the underlying sub-area of the graphic sign 500. Other application processes may also be used, including starting with an adhesive-backed piece of printed perforated film, then adhering the sensor card to the back side (adhesive containing) of the perforated film piece first, with the film piece extending beyond (overlapping) the edges of the Sensor card. The film/sensor combination is then applied to the graphic sign 500, with the overlapping adhesive edges holding the sensor and film piece to the graphic sign 500.

Interactivity cards may be manufactured by installing the above-mentioned components onto a flexible circuit board, using known techniques. Interactivity cards may be installed by adhering or otherwise fastening a sensor card within an area proximate a graphic sign, and adhering or otherwise fastening a response card in an area proximate the sensor card (and within range of the radios). The interactivity cards may then be switched "on" and thus paired, as is described below. They are then may be ready for action, in some embodiments without the further need for technical configuration or analysis.

Figure 6:
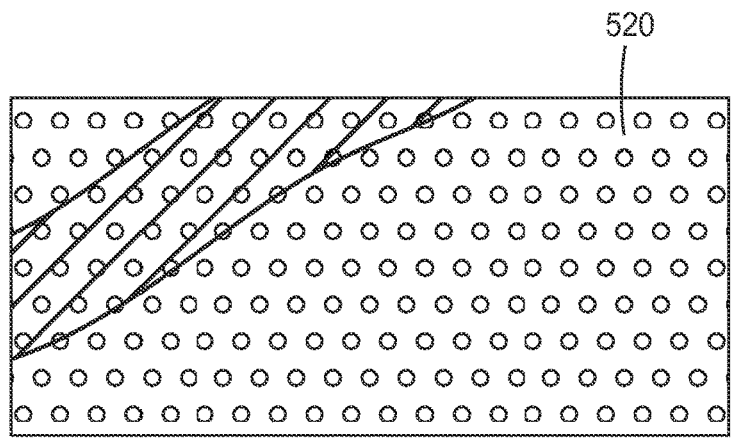
FIG. 6 is a blow-up of the perforated film used in FIG. 5.

FIG. 6 shows a further drawing of perforated film piece 520. The perforated film piece may be based on a 1 to 40 mil thick film, preferably less than 5 mils thick and more preferably 2 mils or less in thickness. The perforated film may be printed using conventional processes such as aqueous based inkjet printing, eco-solvent inkjet printing, solvent inkjet printing, UV inkjet printing, screen printing, offset printing, dye sublimation, and the like.

Figure 7:
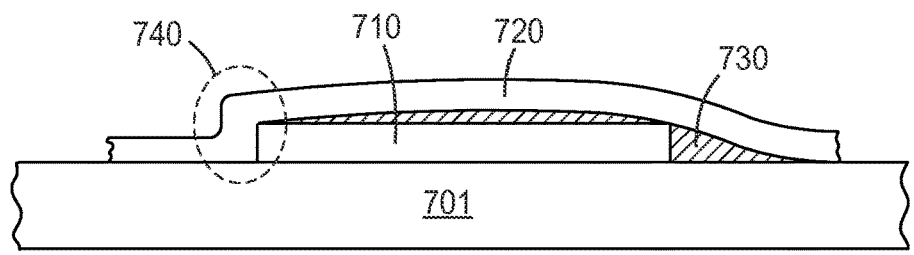
FIG. 7 is a drawing of a cross section of a stack that includes an interactivity card and a perforated film to obscure from view the interactivity card as attached to a graphic film.

FIG. 7 is an illustration of the cross section of the stack that includes the graphic film 701, the sensor 710, and the perforated film piece 720. The degree to which the perforated film piece 720 assumes the topography of the underlying sensor/graphic film substrate will be a function of installation parameters. A looser application process may result in areas 730, which may be adhesive filled, or may just be air gaps. A tighter conformance is show in area 740, where the applicator has taken special care to bond the perforated film piece 720 to two sides of the sensor card and the graphic film surface. The perforations or related features may be modified, for example, to be made more or less dense, in the regions with sharp corners to better conform to the underlying material or provide a smoother surface.

In one embodiment, the perforated film is applied by first determining a sub-area of the underlying graphic where the sensor card might be placed such that it may effectively function as a sensor. For example, in large signs that extend vertically a great distance, it may be advantageous to locate the sensor card nearest pedestrian traffic (if it is pedestrians the sensor is intended to sense). Next, a sub-area of the underlying graphic may be selected. A piece of perforated film is then printed to match the sub-area. Alternatively, the printed graphic may exist pre-printed and then be tailored, by hand, to a specific size through the use of scissors. Yet further, it is possible to have a piece of film (non-perforated) that matches a sub-area of the underlying graphic, then it may be perforated as a further step.

Once the perforated film piece is ready, it may be applied in a direct, non-overlapping manner to a first major surface of the sensor card, then the second, opposite major surface of the sensor card adhered to the underlying graphic positioned so as to match the sub-area of the underlying graphic and reduce visual notice. Alternatively, the perforated film piece may overlap the sensor card, and in such case the perforated film, if adhesive backed, may be used to envelope the sensor card and adhere the edges of the perforated film piece to the underlying graphic. Preferably the sensor is positioned with respect to the perforated film piece so as to allow for sensing activities.

The perforations may vary in size and density to accommodate the sensing functionalities.

Wireless Communication between Cards; Pairing

In one embodiment, one sensor card is paired with one response card. Using the ANT radio protocol, ANT's pairing mechanism is used as follows. The sensor card, which is the ANT master, has a 16-bit device number that is unique amongst the sensor cards being used in the local installation. This 16-bit number can be individually programmed when the card is manufactured, or in the case of the Nordic Semiconductor nRF51422, the 16 least significant bits of the ARM processor's unique device ID can be used. When a sensor card is not currently paired with an activity card, it will set its pairing bit in its ANT Device Type. This information is transmitted as part of the sensor card's radio message. A response card, when it is not currently paired with a sensor card, will pair with any sensor card whose radio message it receives, if that sensor card has its pairing bit set. After it has paired, it sends a response message to its sensor card to indicate that the sensor card has been paired. The sensor card will then clear its pairing bit. The pairing state (paired or unpaired) is stored in nonvolatile memory so cards will keep their pairing state through power cycles or battery changes. Because paired sensor boards have their pairing bit cleared, the possibility that a new activity card will accidently pair with an already paired sensor card is eliminated. In addition, the ANT protocol can use radio signal strength as part of the pairing process, so an activity card will pair with the sensor card that has the strongest radio signal. By placing the two cards to be paired in close proximity (e.g., side by side on a table) this reduces the possibility that the activity card will accidently pair with an already installed sensor card, or another sensor card that is nearby and active, but that is not yet paired.

In another embodiment, using the ANT shard channel feature, one sensor card can be paired with up to 255 or up to 65535 response cards.

In another embodiment, using an ANT radio that supports multiple channels, such as the Nordic Semiconductor nRF51422 that supports up to 8 channels, one response card can pair with multiple sensor cards, one for each channel that is supported.

The invention claimed is:

1. An electronic sensing card comprising:
   a power source;
   a communications module;
   a processor;
   a first sensor component comprising first angle-selective optics disposed in front of a first thin-film photovoltaic pixel, such that the first angle-selective optics are associated with a first field-of-view;
   and wherein the power source, the wireless communications module, the processor, and the first sensor component are communicatively or electrically coupled with one another.

2. The sensing card of claim 1, wherein the communications module comprises a radio.

3. The sensing card of claim 1, further comprising:
   a light collimating layer disposed between the first angle-selective optics and the first thin-film photovoltaic pixel.

4. The sensing card of claim 1, wherein the first thin-film photovoltaic pixel comprises a plurality of photovoltaic cells.

5. The sensing card of claim 1, further comprising:
   a second thin-film photovoltaic pixel communicatively coupled to the process, and disposed in front of a second thin-film photovoltaic pixel, such that the second angle-selective optics are associated with a second field-of-view.

6. The sensing card of claim 5, wherein the first field-of-view and the second field-of-view are distinct.

7. The sensing card of claim 5, wherein the first field-of-view and the second field-of-view minimally overlap.

8. The sensing card of claim 1, wherein the processor is configured to determine when an object is within the first or second field-of-views.

9. The sensing card of claim 8, wherein the processor is configured to, after sensing that an object is within the first or second field-of-views, provide electronic signals to an electronic apparatus.

10. The sensing card of claim 9, wherein the electronic apparatus comprises an electronically addressable display.

11. The sensing card of claim 10, wherein the electronically addressable display changes its display state based upon the signals.

12. The sensing card of claim 5, wherein either the first or second angle-selective optics, or both of them, comprise a conoscopic lens.

13. The sensing card of claim 5, wherein either the first or second angle-selective optics, or both of them, comprise a lenslet.

14. The sensing card of claim 8, wherein the processor is configured to determine the time from when an object enters one of the fields-of-view, to when the object exits that field of view.

15. The sensing card of claim 8, wherein the processor is configured to determine an aspect of the direction an object is moving, based on the signals received from the first and second sensor.

16. The sensing card of claim 8, wherein the processor is configured to determine, and provide signals indicative of, when an object has entered the first or the second field-of-view, and when that object has exited the first or the second field-of-view.

17. The sensing card of claim 8, wherein the object comprises a human.

18. The sensing card of claim 8, wherein the object comprises a human-sized object.

19. The sensing card of claim 8, wherein the object comprises a car-shaped object.

20. The sensing card of claim 3, wherein the light collimating layer comprises a film.

21. The sensing card of claim 3, wherein the light collimating layer comprises glass beads.

22. The sensing card of claim 3, wherein the light collimating layer comprises rear projection film.

23. The sensing card of claim 3, wherein the light collimating layer comprises a first microlouvered film.

24. The sensing card of claim 23, wherein the light collimating layer comprises additionally a second microlouvered film, with the microlouveres of the first microlouvered film orthogonally oriented to the microlouveres of the second microlouvered film.

* * * * *